United States Patent
Gu et al.

(10) Patent No.: US 10,127,593 B2
(45) Date of Patent: Nov. 13, 2018

(54) METHOD AND APPARATUS FOR PRESENTING INFORMATION

(71) Applicant: BAIDU ONLINE NETWORK TECHNOLOGY (BEIJING) CO., LTD., Beijing (CN)

(72) Inventors: Jiawei Gu, Beijing (CN); Yang Li, Beijing (CN); Kai Yu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/322,526

(22) PCT Filed: Jun. 16, 2015

(86) PCT No.: PCT/CN2015/081563
§ 371 (c)(1),
(2) Date: Dec. 28, 2016

(87) PCT Pub. No.: WO2016/134569
PCT Pub. Date: Sep. 1, 2016

(65) Prior Publication Data
US 2017/0352084 A1    Dec. 7, 2017

(30) Foreign Application Priority Data
Feb. 27, 2015    (CN) .......................... 2015 1 0089944

(51) Int. Cl.
G06Q 30/00    (2012.01)
G06Q 30/06    (2012.01)
G06F 17/30    (2006.01)
G06Q 30/02    (2012.01)

(52) U.S. Cl.
CPC ... G06Q 30/0625 (2013.01); G06F 17/30247 (2013.01); G06Q 30/00 (2013.01);
(Continued)

(58) Field of Classification Search
None
See application file for complete search history.

(56) References Cited

U.S. PATENT DOCUMENTS

2001/0027420 A1    10/2001    Boublik
2007/0225861 A1*    9/2007    Kumazawa ............ G06Q 50/06
                                                             700/245
(Continued)

FOREIGN PATENT DOCUMENTS

CN    102411749 A    4/2012
CN    103646332 A    3/2014
(Continued)

OTHER PUBLICATIONS

Feng, He, Mining User-Contributed Photos for Personalized Product Recommendation, Nov. 7, 2013, Elsevier, pp. 409-420 (Year: 2013).*

(Continued)

*Primary Examiner* — William J Allen
*Assistant Examiner* — Timothy J Kang
(74) *Attorney, Agent, or Firm* — Lathrop Gage LLP

(57) ABSTRACT

Proposed are a method and an apparatus for presenting information. The method includes: detecting an off-line user behavior, and acquiring user behavior data; if the user behavior data satisfies a pre-set condition, acquiring on-line resource information according to the user behavior data; and presenting the on-line resource information.

7 Claims, 2 Drawing Sheets

(52) U.S. Cl.
CPC ..... *G06Q 30/0631* (2013.01); *G06Q 30/0643* (2013.01); *G06Q 30/02* (2013.01); *G06Q 30/0201* (2013.01)

(56) References Cited

U.S. PATENT DOCUMENTS

| | | | |
|---|---|---|---|
| 2011/0238503 A1* | 9/2011 | Naini | G06Q 30/02 705/14.66 |
| 2013/0297458 A1* | 11/2013 | Van de Capelle | G06Q 30/0635 705/26.81 |
| 2014/0089145 A1* | 3/2014 | Sunkada | G06F 17/30247 705/26.63 |
| 2016/0042432 A1* | 2/2016 | Wenig | G06Q 30/0631 705/26.7 |

FOREIGN PATENT DOCUMENTS

| | | |
|---|---|---|
| CN | 103824214 A | 5/2014 |
| CN | 104680387 A | 6/2015 |

OTHER PUBLICATIONS

PCT/CN2015/081563 English translation of the International Search Report, dated Nov. 25, 2015, 2 pages.

PCT/CN2015/081563 Written Opinion of the International Searching Authority and English Translation, dated Nov. 25, 2015, 10 pages.

Chinese Patent Application No. 201510089944.5, First Office Action dated Sep. 4, 2017, 7 pages.

Chinese Patent Application No. 201510089944.5, English translation of First Office Action dated Sep. 4, 2017, 7 pages.

* cited by examiner

METHOD AND APPARATUS FOR PRESENTING INFORMATION

CROSS-REFERENCE TO RELATED APPLICATION

This application is a national stage entry of International Application No. PCT/CN2015/081563 and claims priority to and benefits of Chinese Patent Application Serial No. 201510089944.5, entitled "Information presentation method and apparatus", filed by Baidu online network technology (Beijing) CO., LTD., with the State Intellectual Property Office of P. R. China on Feb. 27, 2015.

FIELD

The present disclosure relates to an internet technology field, and more particularly to a method and an apparatus for presenting information.

BACKGROUND

At present, a user may acquire off-line resource information as well as on-line resource information. For example, the user may acquire product information at an off-line physical shop, or, may acquire on-line product information on the internet.

At present, a user may only use a single resource such as off-line resource information or on-line resource information. It is difficult to realize the effective resource allocation by using the off-line resource information and the on-line resource information separately, since each of them has both advantages and drawbacks.

SUMMARY

Embodiments of the present disclosure seek to solve at least one of the problems existing in the related art to at least some extent.

Accordingly, an objective of the present disclosure is to provide a method for presenting information. The method may realize an inter-communication between off-line resource information and on-line resource information and improve the effect of resource allocation.

Another objective of the present disclosure is to provide an apparatus for presenting information.

In order to achieve the above objectives, embodiments of a first aspect of the present disclosure provide a method for presenting information. The method includes: detecting an off-line user behavior, and acquiring user behavior data; acquiring on-line resource information according to the user behavior data if the user behavior data satisfies a preset condition; and presenting the on-line resource information.

With the method for presenting information according to the embodiments of first aspect of the present disclosure, by detecting the off-line user behavior, acquiring the user behavior data, and acquiring the on-line resource information according to the user behavior data, the inter-communication between off-line resource information and on-line resource information may be realized, such that the effect of resource allocation may be improved.

In order to achieve the above objectives, embodiments of a second aspect of the present disclosure provide an apparatus for presenting information. The apparatus includes: a detecting module, configured to detect an off-line user behavior, and to acquire user behavior data; an acquiring module, configured to acquire on-line resource information according to the user behavior data if the user behavior data satisfies a preset condition; and a presenting module, configured to present the on-line resource information.

With the apparatus for presenting information according to the embodiments of second aspect of the present disclosure, by detecting the off-line user behavior, acquiring the user behavior data, and acquiring the on-line resource information according to the user behavior data, inter-communication between off-line resource information and on-line resource information may be realized, such that the effect of resource allocation may be improved.

Embodiments of the present disclosure provide an electronic device. The electronic device includes: one or more processors; a memory having one or more programs stored therein, in which when executed by the one or more processors, the one or more programs cause the one or more processors to perform following operations: detecting an off-line user behavior, and acquiring user behavior data; acquiring on-line resource information according to the user behavior data if the user behavior data satisfies a preset condition; and presenting the on-line resource information.

Embodiments of the present disclosure also provide a non-transitory computer storage medium storing one or more modules, in which when executed the one or more modules configured to perform following operations: detecting an off-line user behavior, and acquiring user behavior data; acquiring on-line resource information according to the user behavior data if the user behavior data satisfies a preset condition; and presenting the on-line resource information.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the accompanying drawings, in which.

DETAILED DESCRIPTION

Figure 1:
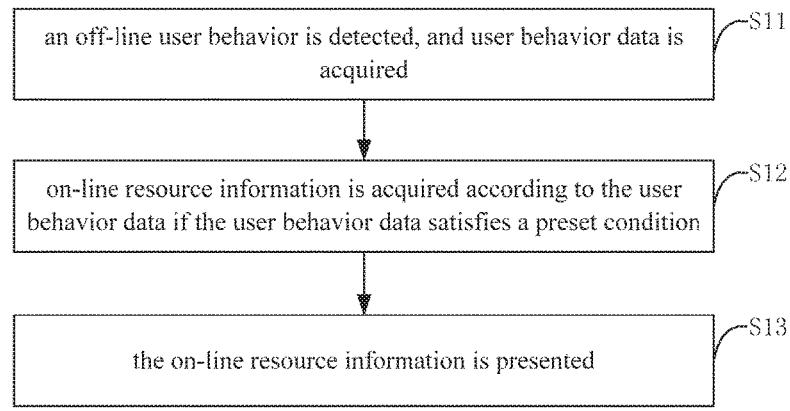
FIG. 1 is a flow chart of a method for presenting information according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure. Instead, the embodiments of the present disclosure comprise all the variants, modifications and their equivalents within the spirit and scope of the present disclosure as defined by the claims.

FIG. 1 is a flow chart of a method for presenting information according to an embodiment of the present disclosure. The method includes the following acts.

In act S11, an off-line user behavior is detected, and user behavior data is acquired.

An execution subject of this embodiment may be an app in a smart device.

A user behavior includes an on-line user behavior and the off-line user behavior, in which the on-line user behavior refers to the user behavior conducted on the Internet and the off-line user behavior refers to the user behavior not conducted on the Internet. For example, the user behavior conducted on the Internet is a behavior like searching, browsing, and clicking product information etc. by a user via Internet, and the user behavior not conducted on the Internet is a behavior like glancing over products by the user in a physical shop in real world etc.

Alternatively, the off-line user behavior may be detected by the smart device carried by the user with him/her, in which the smart device, for example, is a smart phone, a tablet or a wearable smart device etc.

Alternatively, the smart device may be provided with a functional module configured to detect the user behavior, and the user behavior may be detected by the functional module in real time once the functional module is started. The functional module, for example, may be a camera etc.

Specifically, the camera may take a picture of or shoot the user so as to acquire a picture or a video. And the user behavior data may be acquired from the picture or the video.

The user behavior data may include: specific content of the off-line user behavior, and/or, time period corresponding to the specific content of the off-line user behavior.

The specific content of the off-line user behavior refers to an action taken by the user and an object corresponding to the action. For example, staring behavior of the user and information of product stated by the user, behavior of picking up by the user and information of product picked up by the user, and behavior of trying on by the user and information of product tyied on by the user. Specifically, an image in the picture taken by the camera and the video shot by the camera may be identified for acquiring the user action, and the product captured is compared with data in a preset database so that the information of product stared, picked up or tried on by the user is acquired. It should be understood that the product comparison is not limited to the identical product, a similar product may be found, in which a degree of similarity may be pre-set.

Additionally, the time period corresponding to the action taken by the user may also be acquired. For example, the time period during which the user stares the product etc.

In act S12, on-line resource information is acquired according to the user behavior data if the user behavior data satisfies a preset condition.

The preset condition may include preset behavior content, and/or, a preset length of time.

Alternatively, the user behavior data may include: the specific content of the off-line user behavior, and/or, the time period corresponding to the specific content of the off-line user behavior. After the user behavior data is acquired, the method also includes: determining that the user behavior data satisfies the preset condition if the specific content of the off-line user behavior is the preset behavior content, or, if the specific content of the off-line user behavior is the preset behavior content and the corresponding time period reaches the preset length of time.

For example, the preset condition includes that the preset behavior content is a behavior of trying on, and it is determined that the user behavior data satisfies the preset condition if it is detected that the user is trying on something; or, the preset condition includes that the preset behavior content is staring behavior and the preset length of time is T, then it is determined that the user behavior data satisfies the preset condition if the starting behavior of the user is detected and the time duration of staring reaches T.

Alternatively, acquiring on-line resource information according to the user behavior data includes: acquiring a product image of interest to a user according to the user behavior data satisfying the preset condition; and acquiring the on-line resource information corresponding to the product image of interest to the user.

The product image the user is interested in refers to the product image corresponding to the user behavior data if the preset condition is satisfied. For example, the image of product tried on by the user, or, the image of product stared by the user for a time the length of which exceeds a threshold.

For example, when the user tries on the product, the camera on the smart device carried by the user may take a picture of the product tried on by the user, and the smart device may send the picture taken by the camera to a cloud server. The cloud server acquires the product information according to the picture received. Specifically, the cloud server may compare the picture received with pictures stored in a pre-established picture-base, and/or, the cloud server may acquire related text information according to the picture received, and compare the text information with text information stored in a pre-established text-base, so as to acquire the product information matched to the picture received. The cloud server may send the acquired product information to the smart device for presenting after the product information is acquired.

Specifically, the on-line resource information may include: the on-line product information such as a buy-link and specific information of the product such as the product picture, size, color etc. The on-line resource information may also include the information of a product similar to the product the user is interested in, and, information of comparing products with each other, and so on.

In act S13, the on-line resource information is presented.

For example, the on-line resource information may be presented to the user in a presenting module in the smart device if the on-line resource information is acquired from the cloud server by the smart device.

Alternatively, presenting the on-line resource information may include: pushing the on-line resource information to the user at a preset time point for pushing.

For example, the cloud server may pre-set a time point for pushing, and the on-line resource information is sent to the smart device by the cloud server at the preset time point, and then the on-line resource information is pushed to the user by the smart device.

In an embodiment of the present disclosure, by detecting the off-line user behavior, acquiring the user behavior data, and acquiring the on-line resource information according to the user behavior data, an inter-communication between off-line resource information and on-line resource information may be realized, such that the effect of resource configuration may be improved.

Figure 2:
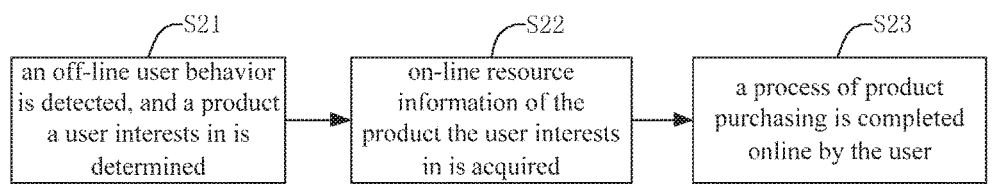
FIG. 2 is a flow chart of a method for presenting information according to another embodiment of the present disclosure.

FIG. 2 is a flow chart of a method for presenting information according to another embodiment of the present disclosure. This embodiment exemplifies that the product information is presented. The method includes the following acts.

In act S21, an off-line user behavior is detected, and a product a user is interested in is determined.

For example, a camera on a smart device carried by the user may be started, and the camera may detect the off-line user behavior in real time so that user behavior data is acquired.

It is determined that the product that the user tries on, picks up or stares is the product the user is interested in, if the user behavior data satisfies a preset condition, for example, if the user tries on the product or picks up the product or stares the product for a time the length of which exceeds a preset length of time when the user shops around a physical shop.

In act S22, on-line resource information of the product the user is interested in is acquired.

For example, after the user tries on the product in an off-line physical shop, the camera may take a picture of the product, and the smart device may send the picture to a cloud server. The cloud server may search in a database according to a matching rule for acquiring corresponding product information, in which the corresponding product information may specifically be the product information corresponding to the product with a same pattern and a same brand, or, may be the product information corresponding to the product with a same pattern but a different brand, or, may be the product information corresponding to the product with a similar pattern, and so on. Specifically, the matching rule used in search may be pre-set.

The cloud server may send on-line product information to the smart device after the on-line product information is found by the cloud server, and then the on-line product information may be presented to the user by the smart device, in which the on-line product information specifically includes buy-link information and a product picture presented online etc.

In act S23, a process of product purchasing is completed online by the user.

For example, the user may select the product to buy according to a buy-link of the product after the on-line resource information is presented to the user by the smart device. The user may also select color and size etc. according to personal preference when buying the product, and fill in a delivery address and pay to complete the process of product purchasing.

Further, the on-line resource information is the product information, and after the on-line resource information is presented, the method also includes: determining an off-line guiding shop after the product purchasing is completed by the user according to the on-line resource information, so that a shop including the on-line resource information corresponding to the product purchasing and the off-line guiding shop conduct a processing according to a preset agreement.

Figure 3:
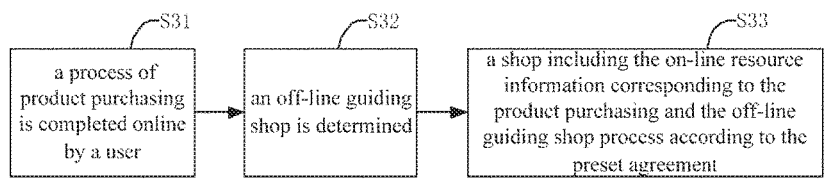
FIG. 3 is a schematic diagram showing a specific process of allocating off-line resource information and on-line resource information according to an embodiment of the present disclosure.

Specifically, FIG. 3 is a schematic diagram showing a specific process of allocating off-line resource information and on-line resource information according to an embodiment of the present disclosure, the process includes the following acts.

In act S31, a process of product purchasing is completed online by a user.

For example, after the on-line resource information is acquired by the user, the user may select color and size etc. according to personal preference when buying the product, and fill in a delivery address and pay for the product to complete the process of product purchasing.

In act S32, an off-line guiding shop is determined.

The off-line guiding shop is an off-line shop where the user stays when the user behavior data satisfies a preset condition.

For example, if the user tries on a product in the off-line shop A and the user buys the product after the on-line resource information of the product is presented, then the off-line guiding shop is A.

Alternatively, the off-line guiding shop may be determined through off-line indoor navigation technology and a history record of glancing over or trying on some products by the user.

In act S33, a shop including the on-line resource information corresponding to the product purchasing and the off-line guiding shop process according to the preset agreement.

The shop including the on-line resource information corresponding to the product purchasing pays partial price of the product to the off-line guiding shop according to the preset agreement, so that a reasonable allocation based on the on-line resource information and the off-line resource information may be realized.

Specifically, identity information of the off-line guiding shop may be determined according to Location Based Service (LBS), and the shop having the product that the user buys online pays partial price to the off-line guiding shop thereafter.

Alternatively, different fees may be paid according to different user behaviors in the shop, for example, the behavior of staring one product and the behavior of trying on the product in a same shop corresponds to different fees respectively, or, different fees may be paid according to the brand of the product that the user is interested in. Specifically, different user behaviors in the shop may be determined according to an indoor navigation, a history record of glancing over or trying on etc.

In this embodiment of the present disclosure, by detecting the off-line user behavior, acquiring the user behavior data, and acquiring the on-line resource information according to the user behavior data, an inter-communication between off-line resource information and on-line resource information may be realized, such that the effect of resource allocation may be improved. In this embodiment, a shop including the on-line resource information corresponding to the product purchasing and the off-line guiding shop conduct a processing according to a preset agreement, such that the rationality of allocation of the on-line resource information and the off-line resource information may be improved. By the inter-communication between off-line resource and on-line resource, advantages of the on-line resource and the off-line resource may be used fully and influence of drawbacks is decreased, which benefits the share of on-line resource and off-line resource, and brings convenience to the user.

Figure 4:
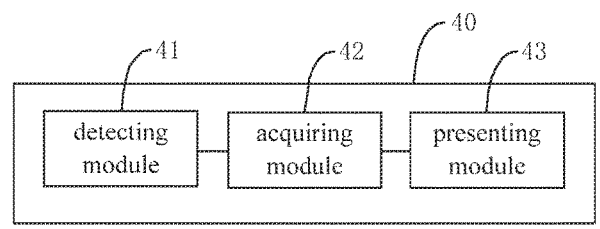
FIG. 4 is a block diagram of an apparatus for presenting information according to another embodiment of the present disclosure.

FIG. 4 is a block diagram of an apparatus for presenting information according to another embodiment of the present disclosure. The apparatus 40 includes a detecting module 41, an acquiring module 42 and a presenting module 43.

The detecting module 41 is configured to detect an off-line user behavior, and to acquire user behavior data.

An execution subject of this embodiment may be an app in a smart device.

A user behavior may include an on-line user behavior and the off-line user behavior, in which the on-line user behavior refers to the user behavior on the Internet and the off-line user behavior refers to the user behavior not on the Internet. For example, the user behavior on the Internet is a behavior like searching, browsing, and clicking product information etc. by a user via Internet, and the user behavior not on the Internet is a behavior like glancing over products by the user in a physical shop in real world etc.

Alternatively, the off-line user behavior may be detected by the smart device carried by the user, in which the smart device, for example, is a smart phone, a tablet or a wearable smart device etc.

In an embodiment, the detecting module 41 is specifically configured to start a preset functional module on the smart device, and to detect the off-line user behavior in real time. The preset functional module includes: a camera.

Specifically, the camera may take a picture of or shoot the user. A picture or a video may be obtained and the user behavior data may be acquired from the picture or the video.

The user behavior data may include: specific content of a user behavior, and/or, time period corresponding to the specific content of the user behavior.

The specific content of the user behavior refers to an action taken by the user and an object corresponding to the action. For example, staring behavior of the user and information of product stated by the user, behavior of picking up by the user and information of product picked up by the user, and behavior of trying on by the user and information of product tried on by the user. Specifically, an image in the picture taken by the camera and the video shot by the camera may be identified for acquiring the user action, and the product captured is compared with data in a preset database so that the information of product stared, picked up or tried on by the user is acquired. It should be understood that the product comparison is not limited to the identical product, a similar product may be found, in which a degree of similarity may be pre-set.

Additionally, the time period corresponding to the action taken by the user may also be acquired. For example, the time period during which the user stares the product etc.

The acquiring module 42 is configured to acquire on-line resource information according to the user behavior data if the user behavior data satisfies a preset condition. The preset condition may include preset behavior content, and/or, a preset length of time.

Figure 5:
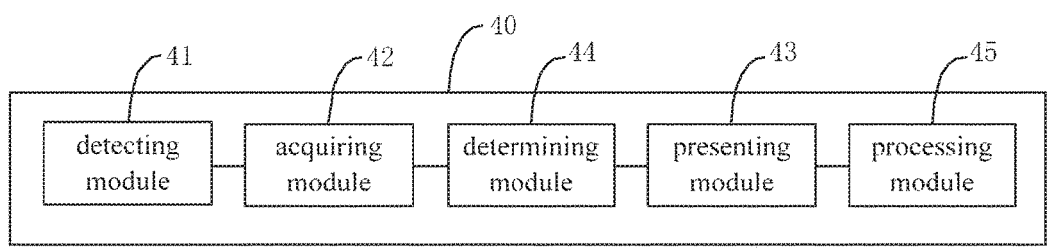
FIG. 5 is a block diagram of an apparatus for presenting information according to another embodiment of the present disclosure.

In another embodiment, the user behavior data may include: the specific content of the user behavior, and/or, the time period corresponding to the specific content of the user behavior. Referring to FIG. 5, the apparatus 40 also includes: a determining module 44, configured to determine that the user behavior data satisfies the preset condition if the specific content of the user behavior is the preset behavior content, or, if the specific content of the user behavior is the preset behavior content and the corresponding time period reaches the preset length of time.

For example, the preset condition includes that the preset behavior content is a behavior of trying on, and it is determined that the user behavior data satisfies the preset condition if it is detected that the user is trying on something; or, the preset condition includes that the preset behavior content is staring behavior and the preset length of time is T, it is determined that the user behavior data satisfies the preset condition if the starting behavior of the user is detected and the time duration of staring reaches T.

In another embodiment, the acquiring module 42 is specifically configured to acquire a product image of interest to a user according to the user behavior data satisfying the preset condition; and to acquire the on-line resource information corresponding to the product image of interest to the user.

The product image the user is interested in refers to the product image corresponding to the user behavior data if the preset condition is satisfied. For example, the image of product tried on by the user, or, the image of product stared by the user for a time the length of which exceeds a threshold.

For example, when the user tries on the product, the camera on the smart device carried by the user may take a picture of the product tried on by the user, and the smart device may send the picture taken by the camera to a cloud server. The cloud server acquires the product information according to the picture received. Specifically, the cloud server may compare the picture received to the picture stored in a pre-established picture-base, and/or, the cloud server may acquire related text information according to the picture received, and compare the text information with the text information stored in a pre-established text-base, so as to acquire the product information matched to the picture received; and the cloud server may send the acquired product information to the smart device for presenting after the product information is acquired.

Specifically, the on-line resource information may include: the on-line product information such as a buy-link and specific information of the product such as the product picture, size, color etc. The on-line resource information may also include the information of a product similar to the product the user is interested in, and, information of comparing products with each other, and so on.

The presenting module 43 is configured to present the on-line resource information. For example, the on-line resource information may be presented to the user in a presenting module in the smart device if the on-line resource information is acquired from the cloud server by the smart device.

In another embodiment, the presenting module 43 is specifically configured to push the on-line resource information to the user at a preset time point.

For example, the cloud server may pre-set a time point for pushing, and the on-line resource information is sent to the smart device by the cloud server at the preset time point, and then the on-line resource information is pushed to the user by the smart device.

In another embodiment, the on-line resource information is product information. Referring to FIG. 5, the apparatus 40 also includes: a processing module 45, configured to determine an off-line guiding shop if a product purchasing is completed by a user according to the on-line resource information, so that a shop comprising the on-line resource information corresponding to the product purchasing and the off-line guiding shop conduct a processing according to a preset agreement.

Specifically, FIG. 3 is a schematic diagram showing a specific process of allocating off-line resource information and on-line resource information, the process includes the following acts.

In act S31, a process of product purchasing is completed online by the user.

For example, after the on-line resource information is acquired by the user, the user may select color and size etc. according to personal preference when buying the product, and fill in a delivery address and pay for the product to complete the process of product purchasing.

In act S32, an off-line guiding shop is determined.

The off-line guiding shop is an off-line shop where the user stays when the user behavior data satisfies a preset condition.

For example, if the user tries on a product in the off-line shop A and the user buys the product after the on-line resource information of the product is presented, the off-line guiding shop is A.

Alternatively, the off-line guiding shop may be determined through off-line indoor navigation technology and a history record of glancing over or trying on some the products by the user.

In act S33, a shop including the on-line resource information corresponding to the product purchasing and the off-line guiding shop process according to the preset agreement.

The shop including the on-line resource information corresponding to the product purchasing pays some fees to the off-line guiding shop according to the preset agreement, so that a reasonable allocation based on the on-line resource information and the off-line resource information may be realized.

Specifically, identity information of the off-line guiding shop may be determine according to Location Based Service (LBS), and the shop corresponding to the product the user buys online pays some fees to the off-line guiding shop thereafter.

Alternatively, different fees may be paid according to different user behaviors in the shop, for example, the behavior of staring one product and the behavior of trying on the product in a same shop corresponds to different fees respectively, or, different fees may be paid according to the brand of the product the user is interested in. Specifically, different user behaviors in the shop may be determined according to an indoor navigation, a history record of glancing over or trying on etc.

In this embodiment of the present disclosure, by detecting the off-line user behavior, acquiring the user behavior data, and acquiring the on-line resource information according to the user behavior data, an inter-communication between off-line resource information and on-line resource information may be realized and the effect of resource allocation may be improved.

Embodiments of the present disclosure also provide an electronic device, including: one or more processors; a memory having one or more programs stored therein, when executed by the one or more processors, the one or more programs cause the one or more processors to: detect an off-line user behavior, and acquire user behavior data; acquire on-line resource information according to the user behavior data if the user behavior data satisfies a preset condition; and present the on-line resource information.

Embodiments of the present disclosure also provide a non-volatile computer storage medium storing one or more modules, if the one or more modules are executed, the one or more modules configured to perform following operations: detecting an off-line user behavior, and acquiring user behavior data; acquiring on-line resource information according to the user behavior data if the user behavior data satisfies a preset condition; and presenting the on-line resource information.

Those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for presenting information, comprising:
acquiring, using a camera of a smart device, a picture by taking a picture of a user or acquiring a video of the user, and acquiring off-line user behavior data of a user from the picture or the video, wherein the off-line user behavior data comprises specific content of the user behavior being performed for a time period;
determining, by the smart device, that the off-line user behavior data satisfies a preset condition in response to the specific content of the user behavior being preset behavior content and the time period reaches a preset length of time;
in response to the determining that the off-line user behavior data satisfies the preset condition, transmitting the picture or video from the smart device to a cloud server; receiving on-line resource information from the cloud server corresponding to a product image of interest to the user, the product of interest being identified by the cloud server according to the picture or video and according to the user behavior data in response to the off-line user behavior data satisfying the preset condition; and
presenting the on-line resource information to the user via display of the smart device;
determining an off-line guiding shop after a product purchasing is completed by the user according to the on-line resource information presented on the smart device, the off-line guiding shop being determined based on location of the smart device in response to the preset condition being satisfied so that a shop comprising the on-line resource information corresponding to the product purchasing and the off-line guiding shop conduct a process according to a preset agreement in response to the product purchasing being completed by the user.

2. The method according to claim 1, wherein acquiring the off-line user behavior comprises:
starting the camera on the smart device, and detecting the off-line user behavior in real time.

3. The method according to claim 1, wherein presenting the on-line resource information comprises:
pushing the on-line resource information from a cloud server to the user at a preset time point.

4. An apparatus for presenting information, comprising:
a camera;
a display; and,
a processor configured to:
acquire, using the camera, a picture by taking a picture of a user or acquiring a video of the user, and acquire off-line user behavior data from the picture or the video, wherein the off-line user behavior data comprises specific content of the user behavior being performed for a time period;
determine that the off-line user behavior data satisfies a preset condition in response to the specific content of the user behavior being preset behavior content and the time period reaches a preset length of time;
in response to the determining that the off-line user behavior data satisfies the preset condition, transmit the picture or video to a cloud server;
receive on-line resource information from the cloud server corresponding to a product image of interest to the user, the product image of interest to the user being identified by the cloud server analyzing the picture or video and according to the user behavior data in response to the off-line user behavior data satisfying the preset condition; and
present the on-line resource information to the user via the display;
determine an off-line guiding shop in response to a product purchasing being completed by the user via the smart device according to the on-line resource information, the off-line guiding shop being determined based on location of the smart device in response to the preset condition being satisfied so that a shop comprising the on-line resource information corresponding to the product purchasing and the off-line guiding shop conduct a processing according to a preset agreement in response to the product purchasing being completed by the user.

5. The apparatus according to claim 4, wherein the one or more processors are configured to acquire the off-line user behavior data by starting the camera on the smart device, and detect the off-line user behavior in real time.

6. The apparatus according to claim 4, the on-line resource information being received via the cloud server pushing the on-line resource information to the smart device at a preset time point.

7. A non-transitory computer storage medium having one or more modules stored therein, wherein when executed the one or more modules configured to perform a method for presenting information, comprising:
acquiring, via a camera of a smart device, a picture by taking a picture of a user or acquiring a video of the user, and acquiring off-line user behavior data from the picture or the video, wherein the off-line user behavior data comprises specific content of the user behavior being performed for a time period;
determining, by the smart device, that the off-line user behavior data satisfies a preset condition in response to the specific content of the user behavior being preset behavior content and the time period reaches a preset length of time;
in response to the determining that the off-line user behavior data satisfies the preset condition, transmit the picture or video from the smart device to a cloud server;
receive at the smart device, on-line resource information from the cloud server corresponding to a product image of interest to the user, the product image of interest to the user being identified by the cloud server analyzing the picture or video and according to the user behavior data in response to the off-line user behavior data satisfying the preset condition;
presenting the on-line resource information to the user via a display of the smart device; and,
determining an off-line guiding shop after a product purchasing is completed by the user via the smart device according to the on-line resource information, the off-line guiding shop being determined based on location of the smart device in response to the preset condition being satisfied so that a shop comprising the on-line resource information corresponding to the product purchasing and the off-line guiding shop conduct a process according to a preset agreement in response to the product purchasing being completed by the user.

* * * * *